United States Patent [19]

Yokoyama

[11] 3,944,030

[45] Mar. 16, 1976

[54] PNEUMATIC TIME-LIMITING DEVICE

[75] Inventor: Eisuke Yokoyama, Musashino, Japan

[73] Assignee: Kawaguchiko Seismitsu Co., Ltd., Japan

[22] Filed: July 9, 1974

[21] Appl. No.: 487,207

[30] Foreign Application Priority Data

July 11, 1973 Japan .............................. 48-77435

[52] U.S. Cl. .................................. 188/298; 200/34

[51] Int. Cl.² ............................................. F16F 9/04

[58] Field of Search ........... 188/298, 301, 270, 320, 188/322; 138/42; 200/34; 73/179

[56] References Cited

UNITED STATES PATENTS

| | | | |
|---|---|---|---|
| 2,508,224 | 5/1950 | Carter | 138/42 |
| 2,735,671 | 2/1956 | Kuhn | 200/34 |
| 3,040,842 | 6/1962 | Charbonneau | 188/298 |
| 3,187,121 | 6/1965 | Mingrone | 188/298 |
| 3,293,384 | 12/1966 | Voigt | 200/34 |
| 3,425,679 | 2/1969 | Risso | 188/298 |

FOREIGN PATENTS OR APPLICATIONS

| | | | |
|---|---|---|---|
| 617,246 | 2/1927 | France | 188/298 |
| 6,878 | 4/1966 | Japan | 188/298 |

*Primary Examiner*—Trygve M. Blix
*Assistant Examiner*—Edward R. Kazenske
*Attorney, Agent, or Firm*—Holman & Stern

[57] ABSTRACT

In a mechano-pneumatic timer device having a vessel, a membrane piston with its skirt fixedly attached to the vessel for defining jointly a variable volume chamber, a spring for urging the piston in its expanding direction, a check valve cooperating with the piston for evacuating air from the chamber to the outside atmosphere when the piston is contracted, a passage for supplementing air from open atmosphere to the chamber when negative pressure prevails in the chamber by virtue of the expanding movement of the piston for a performing predetermined time-limiting operation of the timer, and a device cooperating with the passage for allowing a limited flow rate of the air drawn by the piston, with the device consisting of a composite sheet having a main body formed lengthwise of pervious material such as foamed synthetic resin and a non-pervious cover layer integral with the main body in facial engagement with the passage.

2 Claims, 5 Drawing Figures

PNEUMATIC TIME-LIMITING DEVICE

BACKGROUND OF THE INVENTION

This invention relates to a pneumatic time-limiting device.

PRIOR ART

Time relays and the similar relatively costly and complicated electrical timers are commonly known. Further, a mechano-pneumatic timer is known which comprises a hollow and resilient membrane piston which is spring-loaded and formed at its smaller and thickened end with a fine bleed opening having air flow-limiting threads positioned therethrough. When the membrane is pushed down in its contracting direction against the action of the loading spring so as to evacuate air from a vessel attached with the piston and through a check valve, the piston is charged for gradually recovering its initial position under the influence of the loading spring and by a gradual air invasion from the open atmosphere through the fine opening into the evacuated chamber. The restoring time corresponds to the preset time limitation which is defined by the spring force and the fine air passage area at the flow-limiting opening partially filled with linear threads.

In order to avoid unreliability of the threads in their air flow-limiting performance, it was already proposed by the present applicant to use pervious thin sheet means, preferably of cellophane, plastic, paper or other similar material, in place of the fine threads, to cover the fine air bleed opening or openings, as shown in Japanese Patent Publication No. 6878/1966. This type of improved device has been already marketed with a certain commercial success.

In these improved devices, however, the air flows crosswise through the pervious film or sheet membrane so that unavoidable local fluctuation in the porosity of the membrane material may adversely and variably affect the air passage performance and thus the time-limiting capability of the timer device. Further, a substantial difficulty was met in practice to design the device to provide a longer time limit such as 30 minutes or so.

OBJECT AND SUMMARY OF THE INVENTION

It is an object of the present invention to provide an improved mechano-pneumatic timer device of the spring-loaded membrane piston type in which air can flow longitudinally through a pervious sheet covering an air port cooperating pneumatically with the piston.

The above further objects, features and advantages of the present invention will become more apparent when read in conjunction with the following detailed description of the invention and the accompanying drawings illustrative of a preferred embodiment of the invention.

DETAILED DESCRIPTION OF THE PREFERRED EMBODIMENTS

Figure 1:
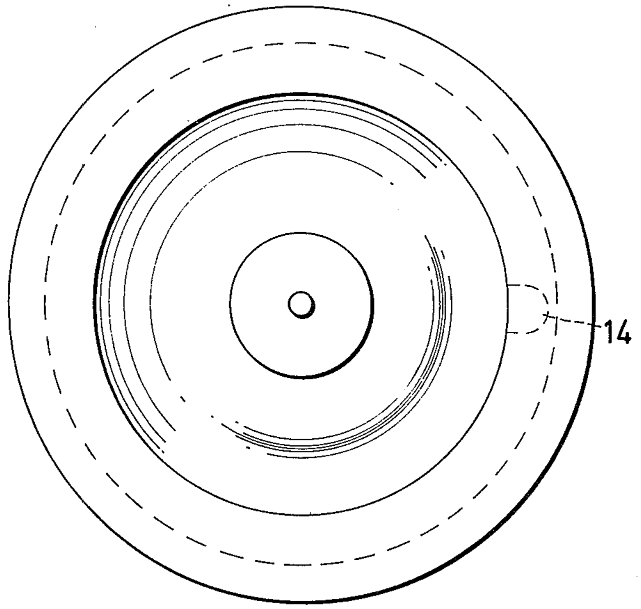
FIG. 1 is a plan view of the essential parts of the timer according to the invention.

Referring to the accompanying drawings, numeral 10 represents generally a vessel comprising a main body 11, a cover 12 and a membrane piston 20, with the body and cover being fixedly attached to each other by means of a plurality of fixing bolts, not shown, and a skirt 21 of the membrane piston is sealingly squeezed between the body 11 and cover 12 for attachment of the piston to the vessel 10.

The main body 11 represents a generally concave section so as to provide a variable volume chamber S in cooperation with the piston 20. The chamber S contains a coil spring 30 which urges resiliently the membrane piston in its expanding direction shown by an arrow A in FIG. 2.

The top of the piston 20 is flattened and thickened at 20a to which a connecting piece 22 is fixedly attached by glueing or the like conventional means. Although not shown, the connecting piece 22 is mechanically connected with a mechanical switch, spray valve or like member to be operated upon, through a connecting lever, link or the like, not shown.

The cover 12 is formed with a depending annular flange 13 which mates with correspondingly shaped upper and outer part of the main body 11, and the flange 13 is formed with a small radial recess 14 for providing a check valve to be described, in cooperation of the skirt 21 of the membrane piston 20. In vertical registration with this recess 14 is vertically extending air duct passage 15 formed through the main body. Normally, the upper end of the passage 15 is sealingly closed by the piston skirt 21.

Figure 2:
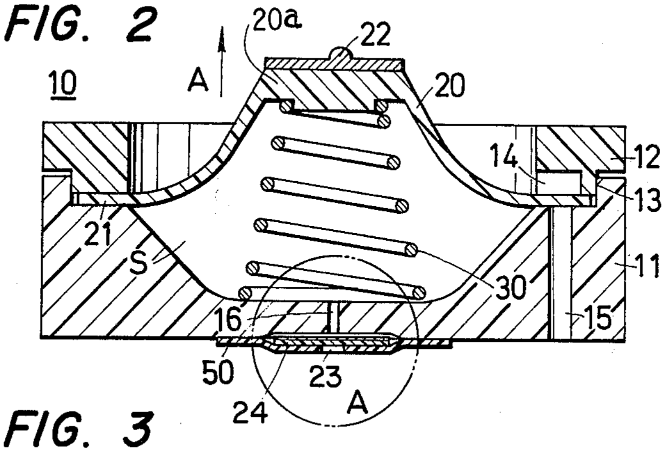
FIG. 2 is a sectional view of the timer shown in FIG. 1 in which the membrane piston is positioned at its fully expanded position.
Figure 3:
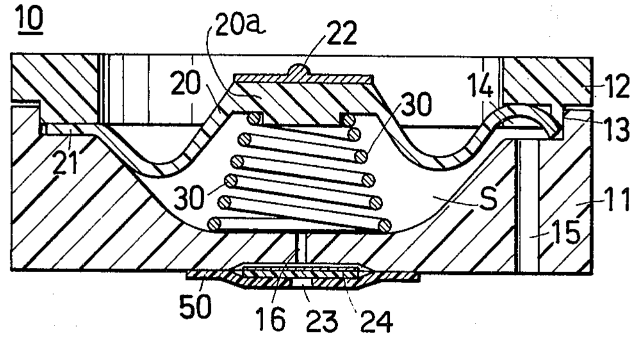
FIG. 3 is a similar view to FIG. 2 in which the membrane piston is positioned at its contracted position adapted for initiation of the time-limiting operation.

When the piston 20 is manually depressed against the action of the coil spring 30 from the position of FIG. 2 to that of FIG. 3, so as to reduce the effective volume of the chamber S, part of the air contained in the chamber will escape through the check valve at 14 and duct passage 15 into the open atmosphere, as illustrated in FIG. 3. Except for the part coacting with the recess 14 to provide the check valve, the piston skirt 21 is tightly and sealingly seized in position, as seen in FIGS. 2 and 3.

Figure 4:
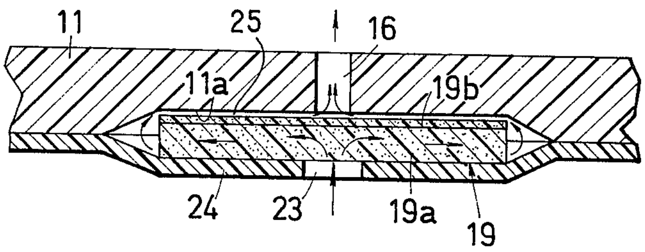
FIG. 4 is an enlarged section of a part of FIG. 2 which is encircled by an imaginary small circle shown therein.

As shown more clearly in FIG. 4, a passage 16 is formed through the bottom wall of the main body 11, preferably at the center thereof as shown, and is maintained in communication with a flat and shallow recess 11*a* formed on the bottom surface of the bottom wall. A disc-shaped, flow-limiting composition 19 is positioned substantially loosely in the recess 11a in a slightly projecting manner therefrom, so as to serve for closing the bottom end of the passage 16. The disc composition 19 has a main body 19a of a previous or fibrous material for allowing a limited passage of air therethrough and is covered at its upper surface with a non-pervious layer 19*b* which may preferably consist of a polyethylene terephthalate film, aluminum or a like light metal foil, as an example, glued to the pervious main body 19*a* which may be of low or high density polyethylene, polypropylene, polyvinyl chloride, felt, thick cloth, nylon, polyester, polystyrene or the like.

By hot-ironing the upper surface of the main body 19*a*, the non-pervious layer can be effectively formed. As an alternative, the layer 19*b* may be formed by wetting the upper surface of the main body 19*a* with a proper resin-dissolving solvent and smoothening the partially dissolved or swollen resin surface by means of a roller, not shown.

The disc composition 19 is fixedly positioned by a fixing sheet or member 24 which is preferably of a synthetic resin material, and fixedly attached at its peripheral area 50 to the bottom surface of main body 11, as by glueing or a like conventional fixing measure. The sheet 24 is of a non-pervious material, such as polyethylene terephthalate and is formed with a single air passage opening 23 extending therethrough. When necessary, this opening 23 may be plural.

When the depressing pressure is released from the contracted state of the piston 20 positioned as shown in FIG. 3, the piston will gradually expand under the spring force at 30 and a negative pressure will be created within the chamber S. Then, the outside atmospheric air will be drawn from the passage 23 and through the fine communicating passages formed and maintained in the material of the pervious material 19*a*, thereby flowing therethrough in the axial direction so-to-speak, or more specifically in outwardly radial directions as schematically illustrated in FIG. 4 by small arrows shown within the pervious material 19*a*, and collected in the peripheral region in and around the recess 11*a* and around the disc composition 19. Then, the drawn air will flow inwardly in and along a small gap 25 existing between the bottom wall of main body 11 and the disc composition 19. In the drawing, this gap 25 has been shown substantially exaggerated for a clear understanding of the invention. In practice, the upper surface of the disc composition 19 may be in contact with the bottom wall of the main body 11. In this way, the piston 20 gradually expands as the negative pressure created in the chamber S is supplemented gradually with the thus drawn-in air until the piston occupies its fully expanded position shown in FIG. 2, with the flow-in rate being kept at a substantially constant value as established by the combined flow resistance at 19*a* and 25. Therefore, the time limit is determined substantially by the combination of the spring force at 30 with the combined flow resistance.

When the piston 20 has been returned to its original position shown in FIG. 2, the limit time terminates and a certain device to be controlled and operatively connected with the connecting piece 22 positioned at the top end of piston 20 is caused to operate or stop, as the case may be.

Upon completion of the operation or the like of the device to be controlled, the piston 20 is depressed for an initiation of the time-limiting operation as before, and so on. The piston-depressing operation may naturally be motorized if necessary, although not shown.

Due to the lengthwise passage of air through the pervious material, in contrast to the transverse flow passage, the time-limiting period may be substantially prolonged.

In addition, especially when the disc composition 19 is kept in contact with the upper bottom surface of the excess 11*a* and air is caused to pass through the finest possible passages formed on and between the related both surfaces, the time-limiting period can be further prolonged.

On account of both features above mentioned time limit fluctuations as may occur among a large number of the time-limiting devices can be substantially obviated.

According to practical experiments, such fluctuations could be limited to only 1 – 2% if even the time limit has been set to a longer period such as 30 – 60 seconds.

Figure 5:
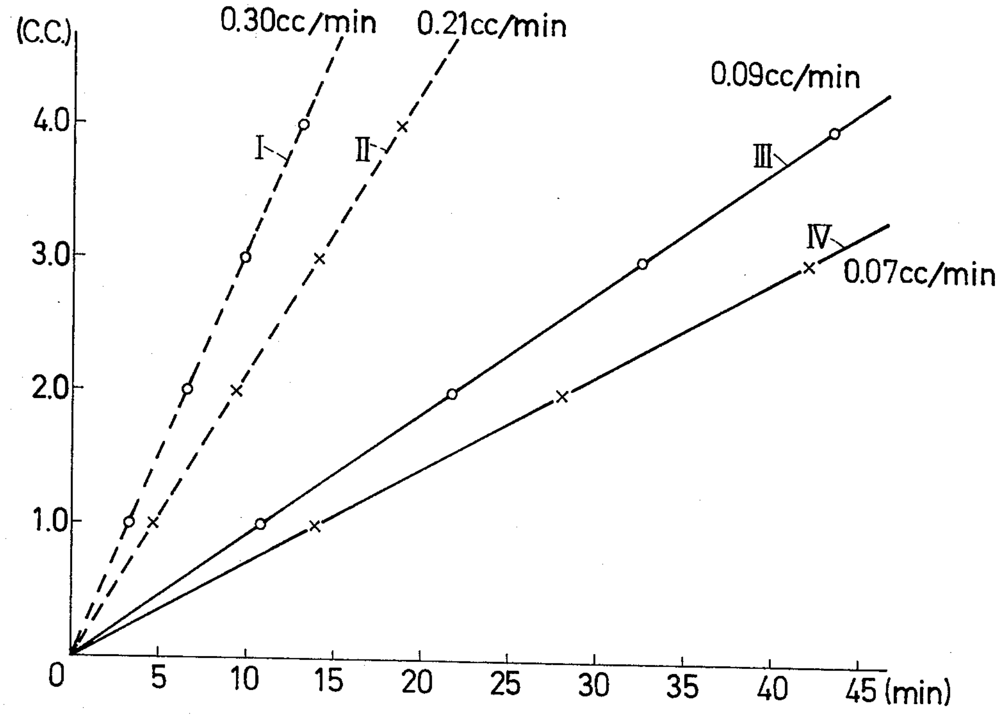
FIG. 5 is a chart showing several examples of time-limiting characteristics of the timer according to this invention.

In FIG. 5, several comparative test results of air flow-limiting pervious sheet materials are shown by way of example.

In the case of curve 1, air passage bore 23 has a diameter of 3.2 mm; the thickness and diameter of the sheet amounted to 120 $\mu$ and 7.0 mm, respectively. The material was biaxially stretched foamed polyethyrene, having no non-pervious surface coating layer.

In the case of curve II, the passage bore sizes were same as above. The thickness and diameter of the disc sheet were 90 $\mu$ and 7.0 mm, respectively. The sheet material was both surface-treated art paper, having no non-pervious surface layer.

In these conventional art cases I and II, the time limit amounted to 20 minutes at the longest. On account of the transverse passage of air, fluctuations in time limit amounted to plus and minus 25% which were disadvantageously large.

In the case of curves III and IV, the respective same pervious disc sheets as in I and II were used and glued fixedly under pressure each with a polyethylene terephthalate film, of 100 $\mu$ thickness, so as to provide the inventive sheet compositions which were tested under similar testing conditions as above. However, the air passage was made lengthwise, instead of transverse. As shown, the time limits could be substantially prolonged. Fluctuations in time limit amounted to only plus and minus 3% which were superior and highly usable in practice.

It should be mentioned that the check valve may be arranged as a separate valve positioned at any suitable place on the piston, although not shown.

An embodiment with the invention in which an exclusive property or privilege is claimed are as follows:

1. A mechano-pneumatic timer device, comprising a vessel having a bottom wall, a membrane piston having a skirt, said skirt being fixedly attached to said vessel for defining jointly with the vessel a variable volume chamber, spring means cooperable with the piston and vessel for urging said piston in its expanding direction, a check valve cooperating with said piston for evacuating air from said chamber to outside open atmosphere when said piston is contracted, the bottom wall of the vessel having a passage for supplementing air drawn from the open atmosphere to said chamber when negative pressure prevails in the chamber by virtue of expanding movement of said piston for performing a predetermined time-limiting operation of the timer, and means cooperating with said passage for allowing a limited flow rate of the air drawn by said piston, said cooperating means including a main body of pervious material closing the passage in the bottom wall of the vessel, said body having upper and lower surfaces, a non-pervious layer secured to the upper surface of the main body, and non-pervious means engaging the lower surface of the main body and secured to the bottom wall of the vessel for fixedly attaching the main body to the bottom wall, said non-pervious means having at least one air passage therein in communication with the lower surface of the main body so that upon negative pressure being created within the chamber, air will be drawn from said one air passage outwardly through the main body and thence inwardly between the bottom wall of the vessel and the non-pervious layer of the main body through the passage and into the chamber.

2. The mechano-pneumatic timer device as claimed in claim 1 in which the bottom wall of the vessel is provided with a recess with which the passage communicates, said main body being positioned in the recess, said main body having outer dimensions less than the inner dimensions of the recess to provide a space about the perimeter of the main body to allow the air flowing outwardly through the main body to flow inwardly between the bottom wall of the vessel and the non-pervious layer of the main body, and said main body and non-pervious layer having a thickness greater than the depth of the recess whereby the lower surface of the main body projects beyond the bottom wall of the vessel.

* * * * *